(12) United States Patent
Nakamori et al.

(10) Patent No.: US 8,824,969 B2
(45) Date of Patent: Sep. 2, 2014

(54) RADIO BASE STATION AND MOBILE COMMUNICATION METHOD

(75) Inventors: Takeshi Nakamori, Tokyo (JP); Hiroyuki Ishii, Tokyo (JP); Kengo Yagyu, Tokyo (JP); Mikio Iwamura, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 116 days.

(21) Appl. No.: 13/697,536

(22) PCT Filed: May 13, 2011

(86) PCT No.: PCT/JP2011/061067
§ 371 (c)(1),
(2), (4) Date: Jan. 8, 2013

(87) PCT Pub. No.: WO2011/142459
PCT Pub. Date: Nov. 17, 2011

(65) Prior Publication Data
US 2013/0102322 A1    Apr. 25, 2013

(30) Foreign Application Priority Data
May 13, 2010    (JP) ................................ P2010-111562

(51) Int. Cl.
*H04W 36/00*    (2009.01)
*H04W 40/00*    (2009.01)
(Continued)

(52) U.S. Cl.
CPC .............. *H04W 48/02* (2013.01); *H04W 36/08* (2013.01); *H04L 5/001* (2013.01); *H04W 36/30* (2013.01); *H04L 5/0037* (2013.01); *H04W 72/0453* (2013.01); *H04W 72/085* (2013.01)
USPC .......... 455/63.1; 455/436; 455/447; 455/455; 455/452.1; 455/561

(58) Field of Classification Search
CPC ..... H04L 5/001; H04L 5/0037; H04W 36/24; H04W 36/30; H04W 36/34; H04W 48/02; H04W 72/0453; H04W 72/085
USPC ................ 455/63.1, 436, 442, 443, 447, 450, 455/452.1, 455, 561
See application file for complete search history.

(56) References Cited

U.S. PATENT DOCUMENTS 6,078,814 A * 6/2000 Jeffries et al. ................. 455/447
6,400,955 B1 * 6/2002 Kawabata et al. ............ 455/450

(Continued)

FOREIGN PATENT DOCUMENTS

| JP | 2001-238251 A | 8/2001 |
| JP | 2004-274220 A | 9/2004 |
| JP | 2009-246875 A | 10/2009 |

OTHER PUBLICATIONS

International Search Report issued in PCT/JP2011/061067 mailed Jun. 28, 2011 (2 pages).

(Continued)

*Primary Examiner* — Wesley Kim
(74) *Attorney, Agent, or Firm* — Osha Liang LLP

(57) ABSTRACT

A radio base station eNB according to the present invention includes a CA controller unit 12 configured to determine a PCC and SCCs to be used for CA communications, and a receiver unit 11 configured to receive "Measurement Report" from a mobile station UE having detected a cell having a higher radio quality in a certain SCC than a predetermined threshold for a period of TTT or longer, the "Measurement Report" containing the radio quality of the detected cell. If the cell having the highest radio quality in a measurement object CC is not under the control of the radio station eNB, the CA controller unit 12 avoids use of the cell having the highest radio quality for SCC communications in the CA communications.

4 Claims, 8 Drawing Sheets

(51) Int. Cl.
  *H04W 74/00* (2009.01)
  *H04B 1/38* (2006.01)
  *H04B 1/00* (2006.01)
  *H04B 15/00* (2006.01)
  *H04L 5/00* (2006.01)
  *H04W 36/30* (2009.01)
  *H04W 48/02* (2009.01)
  *H04W 36/08* (2009.01)
  *H04W 72/04* (2009.01)
  *H04W 72/08* (2009.01)

(56) References Cited

U.S. PATENT DOCUMENTS

| | | | |
|---|---|---|---|
| 6,928,287 B2* | 8/2005 | Trott et al. | 455/447 |
| 2008/0287137 A1* | 11/2008 | Li et al. | 455/450 |
| 2010/0173637 A1* | 7/2010 | Damnjanovic et al. | 455/447 |
| 2011/0070911 A1* | 3/2011 | Zhang et al. | 455/509 |
| 2012/0099466 A1* | 4/2012 | Aoyama et al. | 370/252 |
| 2012/0155408 A1* | 6/2012 | Pedersen et al. | 370/329 |

OTHER PUBLICATIONS

3GPP TR 36.913 V8.0.1; "3rd Generation Partnership Project; Technical Specification Group Radio Access Network; Requirements for further advancements for Evolved Universal Terrestrial Radio Access (E-UTRA) (LTE-Advanced) (Release 8)"; Mar. 2009 (15 pages).

3GPP TS 36.214 V8.7.0; "3rd Generation Partnership Project; Technical Specification Group Radio Access Network; Evolved Universal Terrestrial Radio Access (E-UTRA); Physical layer—Measurements (Release 8)"; Sep. 2009 (12 pages).

* cited by examiner

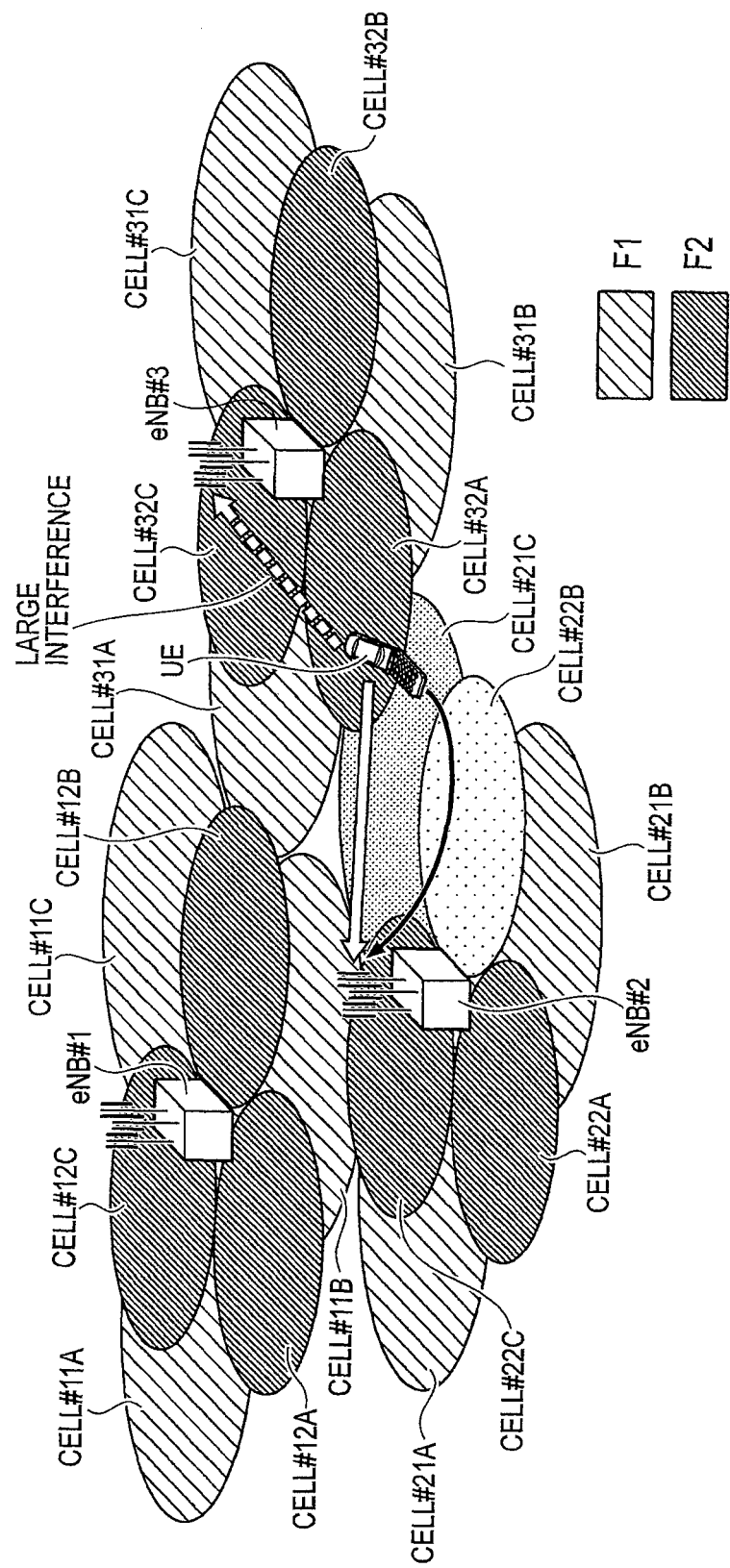

RADIO BASE STATION AND MOBILE COMMUNICATION METHOD

TECHNICAL FIELD

The present invention relates to a radio base station and a mobile communication method.

BACKGROUND ART

The Long Term Evolution (LTE) scheme is a succeeding communication scheme of the Wideband Code Division Multiplexing Access (WCDMA) scheme, the High-Speed Downlink Packet Access (HSDPA) scheme, the High-Speed Uplink Packet Access (HSUPA) scheme, and the like. The 3GPP that is a WCDMA standardization organization has developed the LTE scheme and created the specifications of the LTE scheme.

In addition, the 3GPP is currently developing the LTE-Advanced scheme as a succeeding communication scheme of the LTE scheme. The requirements of the LTE-Advanced scheme are described in Non-Patent Document 1.

In the LTE-Advanced scheme, the implementation of "Carrier aggregation (CA)" communications has been agreed as one of the requirements.

If the "CA communications" are implemented, mobile stations each can receive downlink signals by using multiple carriers at the same time, and can transmit uplink signals by using multiple carriers at the same time. Each carrier used in the operation of the carrier aggregation is referred to as a Component Carrier (CC).

In a mobile communication system including multiple cells, a mobile station UE (User Equipment) is configured to continue communications by switching cells when moving from one cell to another cell. Such cell switching is referred to as "handover."

In general, a mobile communication system is configured that a mobile station performs handover to a neighboring cell when the radio quality of a signal from the neighboring cell becomes higher than the radio quality of a signal from a serving cell.

In this respect, for example, the received power of a signal is used as the above radio quality of the signal. More specifically, the received power of the signal is the received power of a downlink reference signal (RSRP: Reference Signal Received Power) sent from the neighboring cell or serving cell, for example (see Non-Patent Document 2 TS36.214, V8.7.0 for the definition of RSRP).

Instead of the RSRP, the radio quality of a downlink reference signal (RSRQ: Reference Signal Received Quality), the SIR (RS-SIR) of a downlink reference signal, CQI (Channel Quality Indicator), CSI (Channel State Information), or the like is used as the aforementioned radio quality of the signal in some cases.

With reference to FIG. 7 and FIG. 8, specific explanation is provided for one example of such handover procedure. In the following explanation, the received power of the signal (RSRP) is used as the radio quality of the signal.

As shown in FIG. 7, a mobile station UE measures the received powers of signals from a serving cell and a neighboring cell in step S1. In addition, in parallel with the measurement, the mobile station UE may perform cell search to detect an undetected neighboring cell. The cell search and the measurement of the ratio qualities (received powers) of the serving cell and the neighboring cell in this process may be collectively referred to as Measurement.

In step S2, the mobile station UE judges whether or not the received power of the signal from the neighboring cell satisfies the following (Equation 1):

Received Power of Signal from Neighboring cell+
Hysteresis>Received Power of Signal from Serving cell        (Equation 1).

When judging that the above (Equation 1) is satisfied, the mobile station UE notifies a network of "Measurement Report (Event A3)" for reporting the result of the above measurement.

Specifically, as shown in FIG. 8, the mobile station UE measures the received powers of signals from the serving cell (cell A) and a neighboring cell (cell B) which is a measurement object, and judges whether or not to send a notification of the above measurement result, by using "hysteresis [dB]" and "TTT (Time To Trigger) [ms]" which are informed in advance.

Specifically, in FIG. 8, the mobile station UE judges that the notification of the above measurement result (Measurement report) should be sent, if the received power (received quality) of the signal from the cell B is kept higher than the received power (received quality) of the signal from the cell A, by "hysteresis" or more, continuously for the predetermined time period "TTT" or longer.

Here, the "hysteresis" is a value set to avoid frequent handover from the serving cell to a neighboring cell at the cell boundary, and may take either of a positive value and a negative value. In general, a negative value is set as the "hysteresis."

Then, upon receipt of the notification of the event A3, the network determines that the mobile station UE should perform handover to the cell related to the received "Measurement Report (Event A3)" in step S3.

Here, (Equation 1) may take another form such as the following (Equation 2). In the case of (Equation 2), both the hysteresis and offset work as hysteresis:

Received Power of Signal from Neighboring Cell−
Hysteresis>Received Power of Signal from Serving Cell+Offset        (Equation 2).

In the general operation of the CA communications, the mobile station UE performs for each CC the foregoing steps of measuring the received powers of signals from the serving cell and the neighboring cell, and sending Measurement report.

PRIOR ART DOCUMENT

Non-Patent Document

Non-Patent Document 1: 3GPP TS36.913 (V8.0.1)
Non-Patent Document 2: 3GPP TS36.214 V8.7.0 (2009-09)

SUMMARY OF THE INVENTION

Problems to be Solved by the Invention

Here, let's consider a case where, in a mobile communication system in the LTE-Advanced scheme having a structure as illustrated in FIG. 9, a mobile station UE using as a PCC (Primary Component Carrier) with a carrier frequency F1 used in a cell #21C adds as a SCC (Secondary Component Carrier) a carrier frequency F2 used in a cell #22B.

In this case, if the radio quality of the cell "22B in the mobile station UE is not very good, the mobile station UE needs to increase the transmission power in the cell #22B in order that radio waves can reach a radio base station eNB#2.

Instead, even though the transmission power is fixed, there is a cell #32A, using the same carrier frequency F2 and receiving the larger received power from the mobile station UE than the cell #22B with which the mobile station UE is to perform communications, in some cases.

In either of the cases, there is a problem the radio base station eNB#3 neighboring the radio base station eNB#2 receives large interference.

For this reason, the present invention has been made with a view to solving the above problem. Accordingly, an objective of the present invention is to provide a radio base station and a mobile communication method which are capable of performing CA communications in consideration of influence of interference with a neighboring radio base station.

Means for Solving the Problems

A first feature of the present invention is a radio base station capable of performing communications with a mobile station by using a primary carrier and one or more secondary carriers which are different in carrier frequency from the primary carrier, the radio base station including: a controller unit configured to determine a primary carrier and secondary carriers to be used in the communications; and a receiver unit configured to receive a measurement report from the mobile station that has detected a cell having a higher radio quality than a predetermined threshold for a predetermined time period or longer, or a cell in a carrier other than the primary carrier, the cell having a higher radio quality than a value obtained by subtracting a predetermined value from the radio quality of a cell during communication on the primary carrier, the measurement report containing the radio quality of the detected cell, wherein if the cell having the highest radio quality in a measurement object carrier is not under the control of the radio base station, the controller unit avoids use of the cell having the highest radio quality in communications on the secondary carriers.

A second feature of the present invention is a radio base station capable of performing communications with a mobile station by using a primary carrier and one or more secondary carriers which are different in carrier frequency from the primary carrier, the radio base station including: a controller unit configured to determine a primary carrier and secondary carriers to be used in the communications; and a receiver unit configured to receive a measurement report from the mobile station that has detected a cell in a certain secondary carrier, the cell having a higher radio quality than the radio quality of a cell during communications by a predetermined offset value or more for a predetermined time period or longer, the measurement report containing the radio quality of the detected cell, wherein if the cell having the highest radio quality in a measurement object carrier is not under the control of the radio base station, the controller unit removes the secondary carrier from the communications.

A third feature of the present invention is a mobile communication method for operating communications between a mobile station and a radio base station by using a primary carrier and one or more secondary carriers which are different in carrier frequency from the primary carrier, the method including the steps of: sending a measurement report to the radio base station from the mobile station when the mobile station detects a cell having a higher radio quality than a predetermined threshold for a predetermined time period or longer, or a cell in a carrier other than the primary carrier, the cell having a higher radio quality than a value obtained by subtracting a predetermined value from the radio quality of the cell during communications on the primary carrier, the measurement report containing the radio quality of the detected cell; and if the cell having the highest radio quality in a measurement object carrier is not under the control of the radio base station, causing the radio base station to avoid use of the cell having the highest radio quality in the communications.

A fourth feature of the present invention is a mobile communication method for operating communications between a mobile station and a radio base station by using a primary carrier and one or more secondary carriers which are different in carrier frequency from the primary carrier, the method including the steps of: sending a measurement report to the radio base station from the mobile station when the mobile station detects a cell in a certain secondary carrier, the cell having a higher radio quality than the radio quality of the cell during communications by a preset offset value or more for a predetermined time period or longer, the measurement report containing the radio quality of the detected cell; and if the cell having the highest radio quality in a measurement object carrier is not under the control of the radio base station, causing the radio base station to remove the secondary carrier from the communications.

Effects of the Invention

As described above According to the present invention, a radio base station and a mobile communication method which are capable of performing CA communications in consideration of the influence of interference with a neighboring radio base station can be provided.

BRIEF DESCRIPTION OF DRAWINGS

FIG. 9 is a diagram for explaining a conventional mobile communication system.

MODES FOR CARRYING OUT THE INVENTION (Mobile Communication System According to First Embodiment of the Present Invention)

With reference to FIG. 1 to FIG. 6, description is provided for a mobile communication system according to a first embodiment of the present invention.

Figure 1:
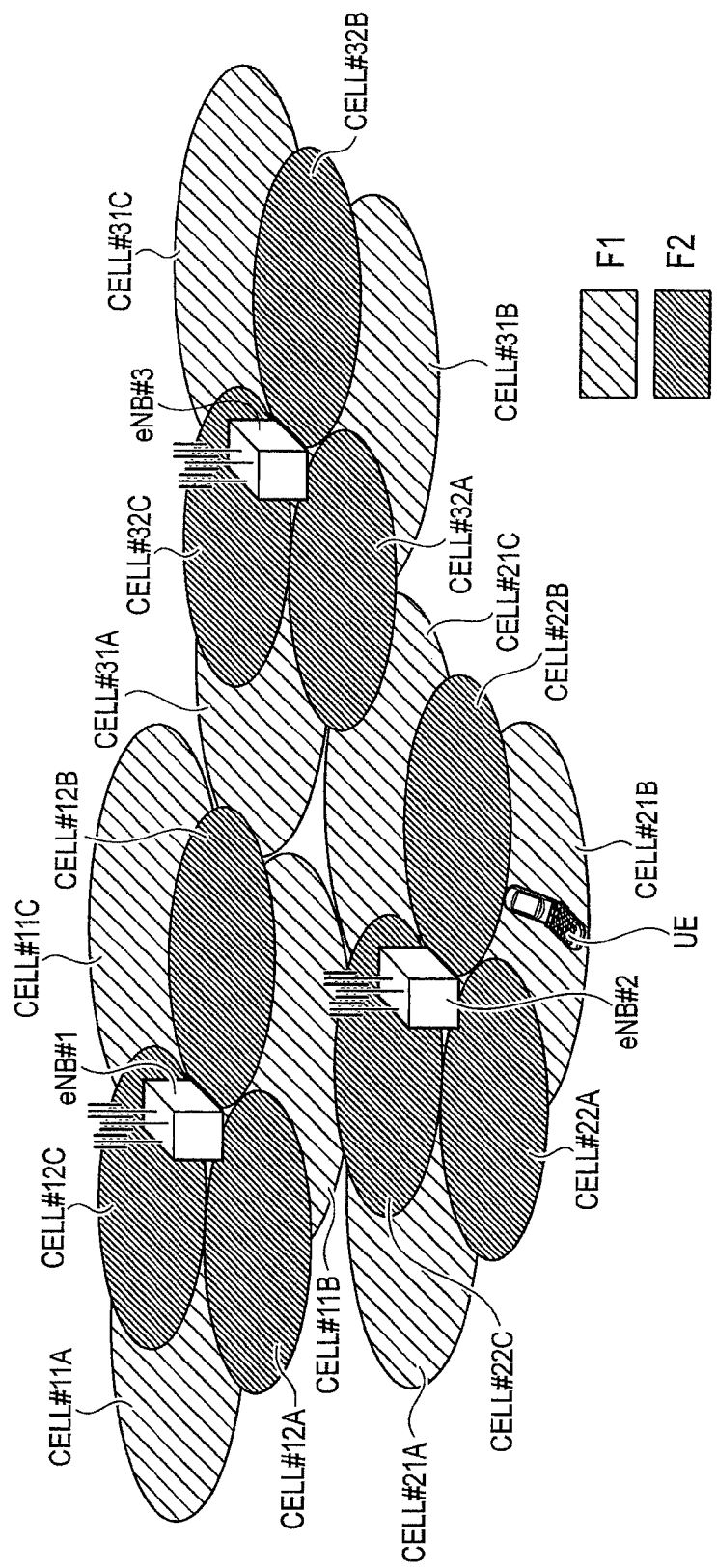
FIG. 1 is an entire configuration diagram of a mobile communication system according to a first embodiment of the present invention.

The mobile communication system according to this embodiment is a mobile communication system in the LTE- Advanced scheme, and includes a radio base station eNB#1, a radio base station eNB#2 and a radio base station eNB#3 as shown in FIG. 1.

As shown in FIG. 1, there are arranged a cell #11A, a cell #11B, a cell #11C, a cell #12A, a cell #12B, and a cell #12C under the control of the radio base station eNB#1, there are arranged a cell #21A, a cell #21B, a cell #21C, a cell #22A, a cell #22B, and a cell #22C under the control of the radio base station eNB#2, and there are arranged a cell #31A, a cell #31B, a cell #31C, a cell #32A, a cell #32B, and a cell #32C under the control of the radio base station eNB#3.

Here, the cell #11A, the cell #11B, the cell #11C, the cell #21A, the cell #21B, the cell #21C, the cell #31A, the cell #31B and the cell #31C each use a carrier frequency F1.

Similarly, the cell #12A, the cell #12B, the cell #12C, the cell #22A, the cell #22B, the cell #22C, the cell #32A, the cell #32B and the cell #32C each use a carrier frequency F2.

In this mobile communication system, a mobile station UE and the radio base stations eNB#1 to eNB#3 are configured to be capable of performing CA communications with each other by using a cell configured with a primary carrier (PCC) and one or more cells configured with one or more secondary carriers (SCCs) which are different in carrier frequency from the PCC.

For example, the mobile station UE is configured to be able to perform CA communications using, for example, CCs (5 MHz) in an 800 MHz band and CCs (5 MHz) in a 2 GHz band.

Hereinafter, the radio base stations eNB#1 to eNB#3 are collectively referred to as a "radio base station eNB" if not otherwise specified, because the functions of the radio base stations eNB#1 to eNB#3 are basically the same.

In addition, the mobile station UE can use only CCs under the control of one radio base station eNB when performing the CA communications.

Note that, in the CA communications, the radio base station eNB is configured to designate CCs to be used as the PCC and the SCCs in each mobile station UE.

Moreover, the mobile station UE is configured to measure the radio quality of each of cells in a measurement object CC designated in "Measurement Object" contained in "Measurement Configuration" sent from the radio base station eNB, at regular intervals.

Then, the mobile station UE is configured to send "Measurement Report" to the radio base station eNB if a reporting condition (for example, any of Event A1 to Event A5 specified by the 3GPP) designated in "Reporting Configuration" contained in "Measurement Configuration" sent from the radio base station eNB is satisfied. The "Measurement Report" contains a result of the above measurement (the ID of a cell that satisfies the above reporting condition among the cells in the measurement object CC, and the radio quality of the cell).

Figure 2:
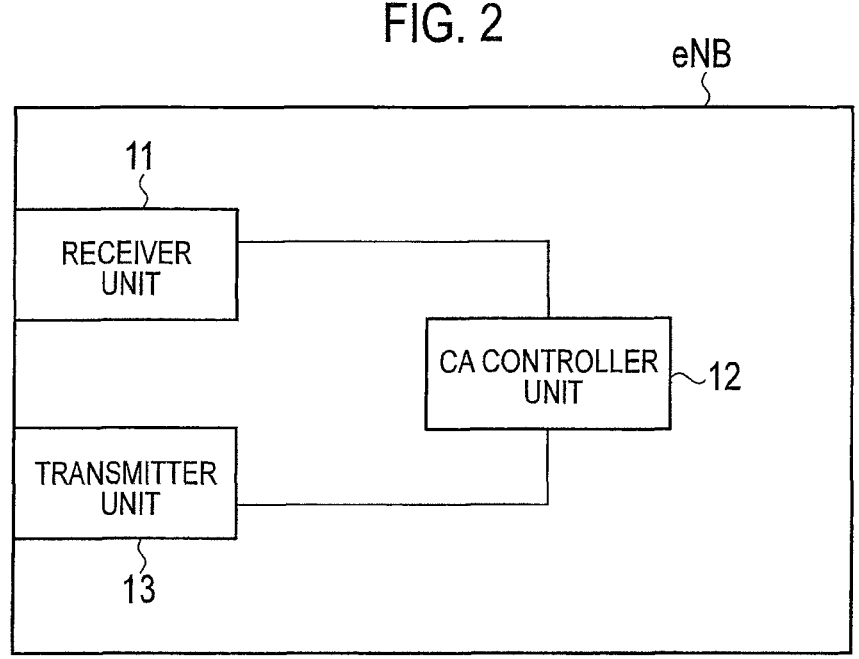
FIG. 2 is a functional block diagram of a radio base station according to the first embodiment of the present invention.

As shown in FIG. 2, the radio base station eNB includes a receiver unit 11, a CA controller unit 12, and a transmitter unit 13.

The receiver unit 11 is configured to receive signals sent by each mobile station UE. The receiver unit 11 is configured to receive, for example, the aforementioned "Measurement Report" from the mobile station UE.

The CA controller unit 12 is configured to determine the PCC and SCCs to be used for the CA communications in each mobile station UE.

For example, if a cell contained in the received "Measurement Report" and having the highest radio quality in the measurement object CC is not under the control of the radio base station eNB, and if the CC used in the cell is not used as a SCC in the CA communications, the CA controller unit 12 avoids use of the cell in the SCC communications.

In addition, if a cell contained in the received "Measurement Report" and having the highest radio quality in the measurement object CC is not under the control of the radio base station eNB, and if the CC used in the cell is currently used as a SCC in the CA communications, the CA controller unit 12 removes the CC from the SCCs.

The transmitter unit 13 is configured to send signals to each mobile station UE. For example, the transmitter unit is configured to send each mobile station UE "RRC Reconfiguration" instructing a change of the PCC or SCC to be used in CA communications, an addition of a SCC, or a removal of a SCC.

Hereinafter, operations of the mobile communication system according to the first embodiment of the present invention are described with reference to FIG. 3 to FIG. 6. This description is based on the assumption that the mobile station UE performs communications through the cell #21B under the control of the radio base station eNB#2 as shown in FIG. 1.

Figure 3:
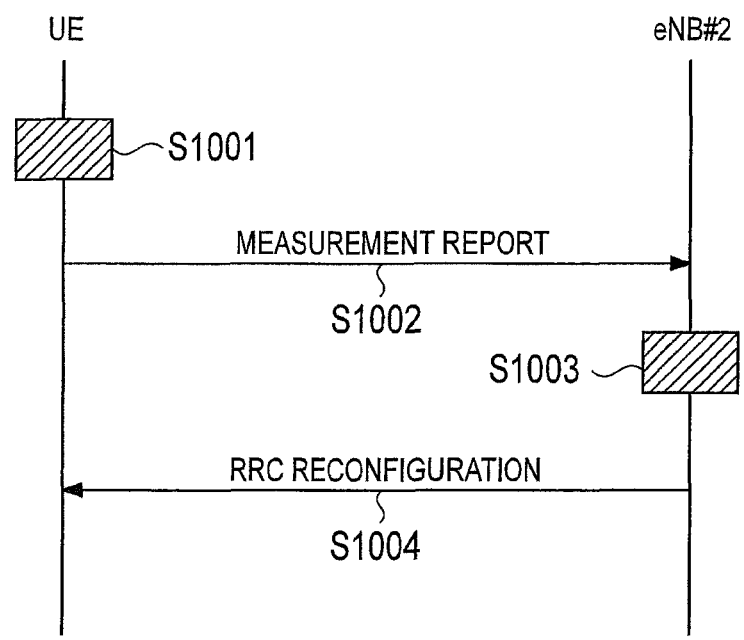
FIG. 3 is a sequence diagram illustrating an operation of the mobile communication system according to the first embodiment of the present invention.
Figure 4:
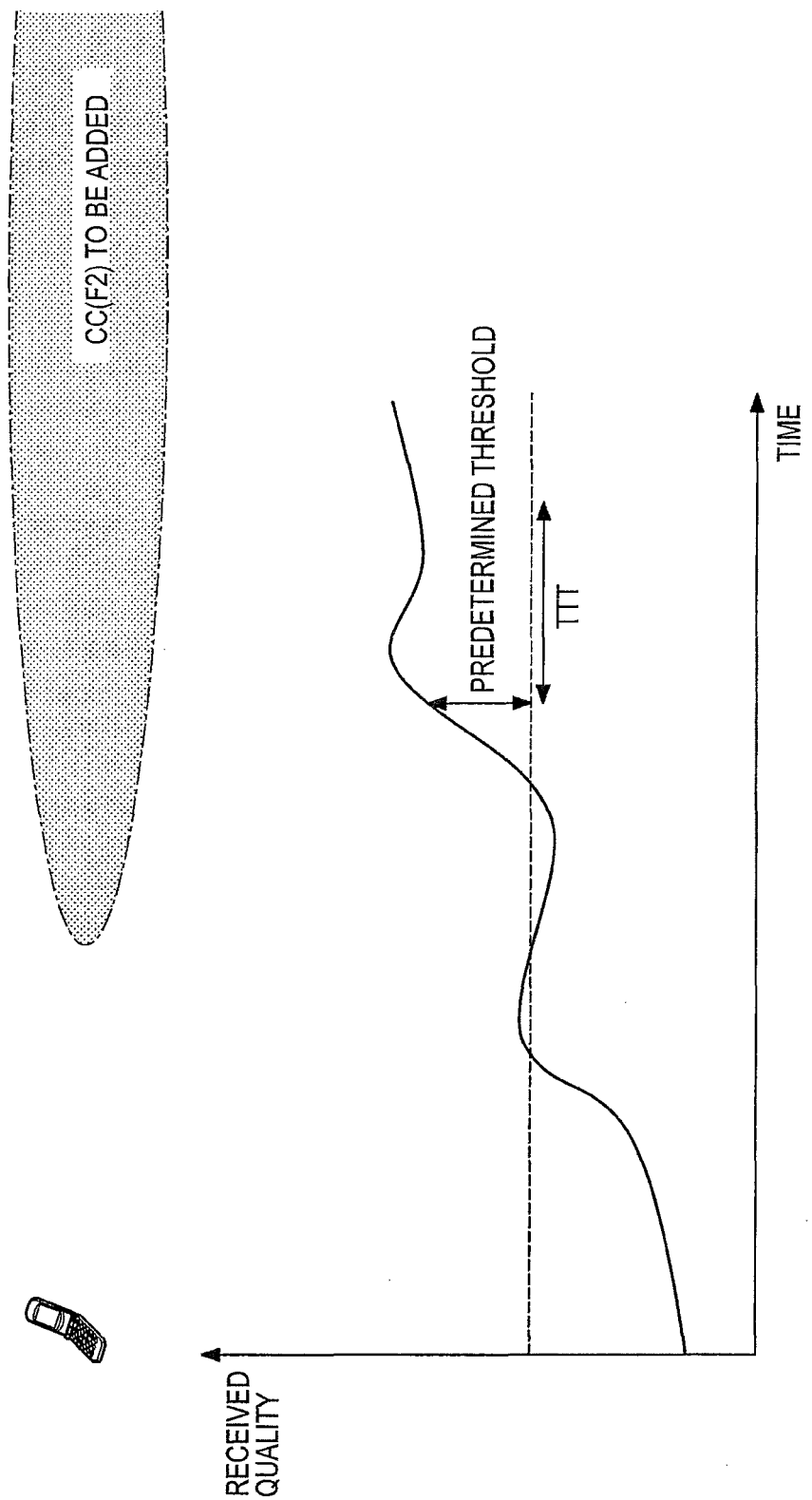
FIG. 4 is a diagram for explaining an operation of the mobile communication system according to the first embodiment of the present invention.

Firstly, a first operation of the mobile communication system according to the first embodiment of the present invention is described with reference to FIG. 3 and FIG. 4.

The mobile station UE performs measurement for each of cells in the measurement object CC. If the mobile station UE detects a cell having a higher radio quality than a predetermined threshold for a period of TTT (Time To Trigger) or longer as shown in FIG. 4, or a cell configured with a CC other than the PCC and having a higher radio quality than a value obtained by subtracting a predetermined value from the radio quality of the cell (serving cell) during the PCC communications in step S1001, the mobile station UE sends the radio base station eNB#2 "Measurement Report" containing the ID and the radio quality of the detected cell in step S1002. Here, the predetermined value may be either of a positive value and a negative value. In step S1003, the radio base station eNB#2 judges whether or not to add, as a SCC for the CA communications, the cell contained in the "Measurement Report" and having the highest radio quality in the measurement object CC.

Here, if the cell having the highest radio quality is under the control of the radio base station eNB#2, the radio base station eNB#2 judges that the cell having the highest radio quality should be used in the SCC communications, and sends the mobile station UE "RRC Reconfiguration" indicating the judgment result in step S1004.

On the other hand, if the cell having the highest radio quality is not under the control of the radio base station eNB#2, the radio base station eNB#2 judges that the cell having the highest radio quality should not be used in the SCC communications.

This is because CA communications using CCs under the control of different radio base stations eNB cannot be performed in the LTE-Advanced scheme.

Figure 5:
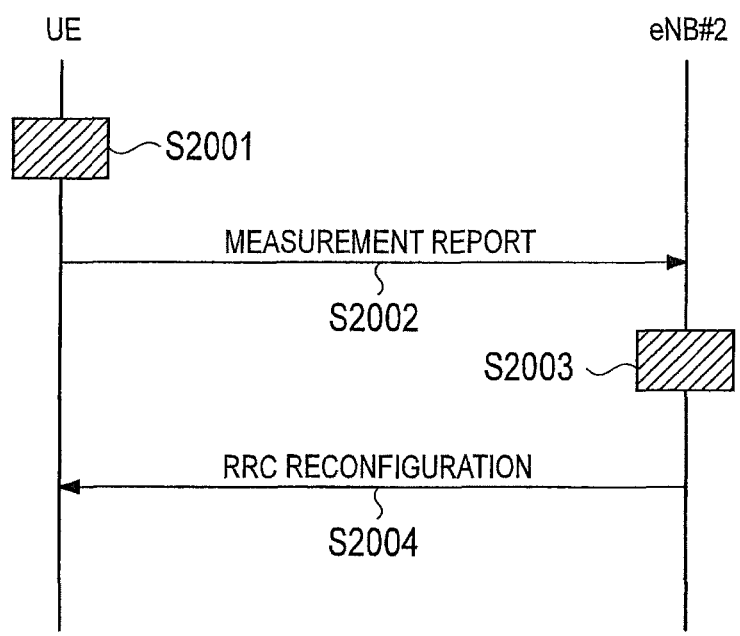
FIG. 5 is a sequence diagram illustrating an operation of the mobile communication system according to the first embodiment of the present invention.
Figure 6:
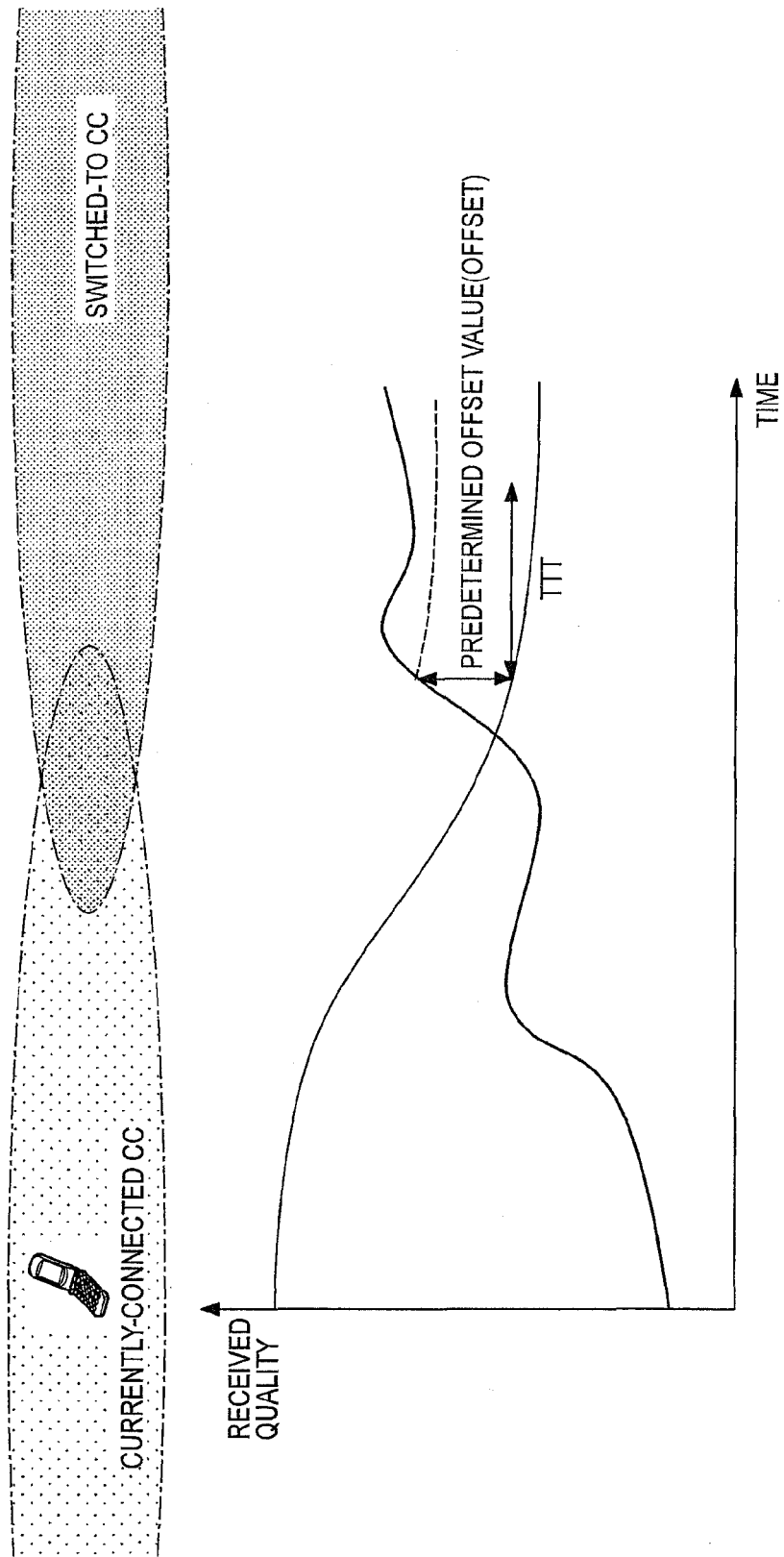
FIG. 6 is a diagram for explaining an operation of the mobile communication system according to the first embodiment of the present invention.
Figure 7:
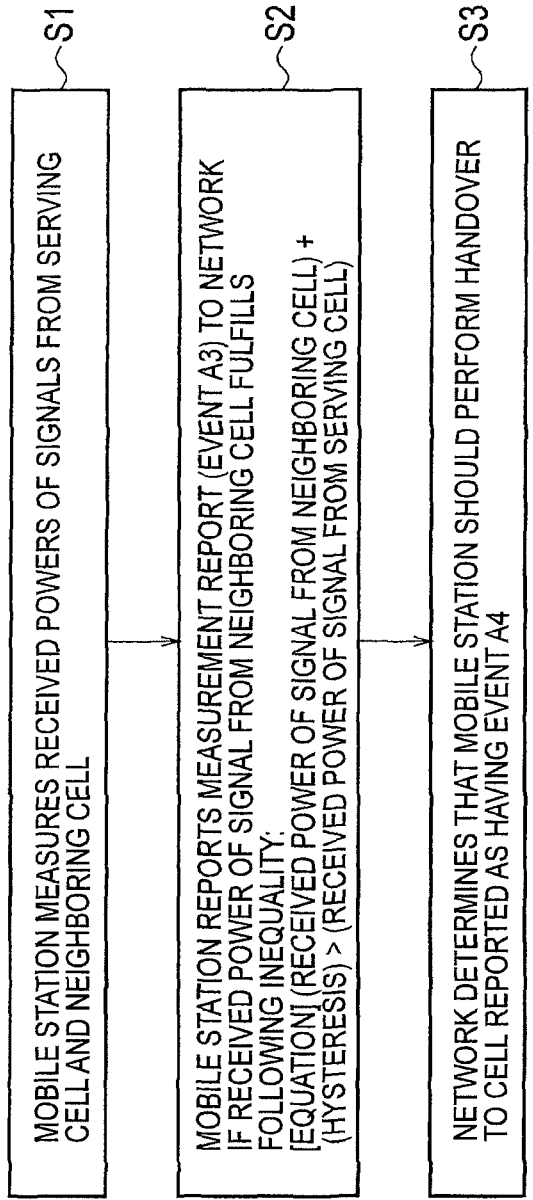
FIG. 7 is a diagram for explaining a conventional mobile communication system.
Figure 8:
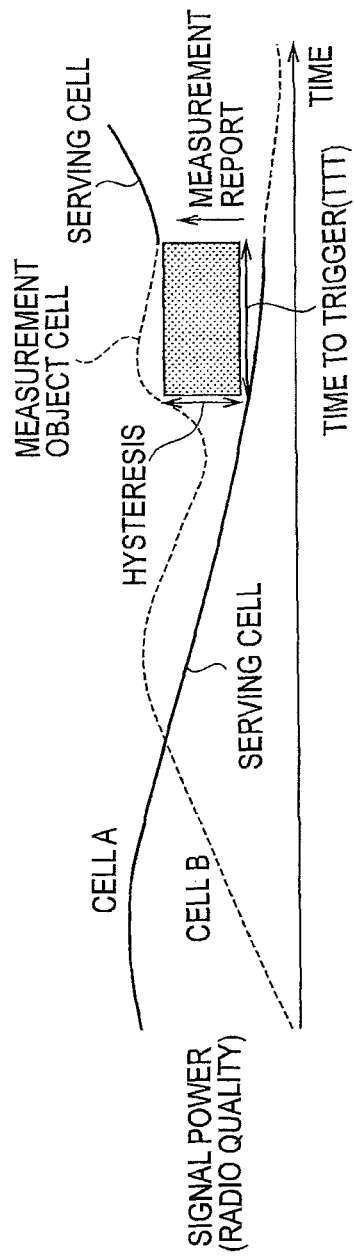
FIG. 8 is a diagram for explaining a conventional mobile communication system.

Secondly, a second operation of the mobile communication system according to the first embodiment of the present invention is described with reference to FIG. 5 and FIG. 6.

The mobile station UE performs measurement of each of cells in the SCCs. If the mobile station UE detects a cell in any of the SCCs, the cell having a higher radio quality than the radio quality of the cell during communications by a predetermined offset value or more for a period of TTT (Time To Trigger) or longer in step S2001, as shown in FIG. 6, the mobile station UE sends the radio base station eNB#2 "Measurement Report" containing the ID and the radio quality of the detected cell in step S2002.

In step S2003, the radio base station eNB#2 judges whether or not to remove the above SCC based on the received "Measurement Report."

Here, if the cell contained in the received "Measurement Report" and having the highest radio quality in the SCC is under the control of the radio base station eNB#2, the radio base station eNB#2 judges that the above cell during communications should be changed to the cell having the highest radio quality, and sends the mobile station UE "RRC Reconfiguration" indicating the judgment result in step S2004.

On the other hand, if the cell having the highest radio quality is not under the control of the radio base station eNB#2, the radio base station eNB#2 judges that the SCC should be removed, and sends the mobile station UE "RRC Reconfiguration" indicating the judgment result in step S2004.

In the mobile communication system according to the first embodiment of the present invention, the radio base station eNB determines a change, addition and removal of a cell to be used for SCC communications on the basis of the radio qualities measured by the mobile station UE in the measurement object CC. Thus, CA communications can be operated while curbing the influence of interference with a neighboring radio base station eNB.

The features of the aforementioned embodiment may be expressed as follows.

A first feature of the embodiment is a radio base station eNB capable of performing CA communications with a mobile station by using a PCC (primary carrier) and one or more SCCs (secondary carriers) which are different in carrier frequency from the PCC. The radio base station eNB includes a CA controller unit 12 configured to determine a PCC and SCCs to be used for the CA communications, and a receiver unit 11 configured to receive "Measurement Report (a measurement report)" from the mobile station UE that has detected a cell having a higher radio quality than a predetermined threshold for a period of TTT (predetermined time period) or longer, or a cell configured with a carrier other than the PCC and having a higher radio quality than a value obtained by subtracting a predetermined value from the radio quality of the cell (serving cell) during PCC communications, the "Measurement Report" containing the radio quality of the detected cell (and the ID of the cell). If the cell having the highest radio quality in the measurement object CC is not under the control of the radio base station eNB, the CA controller unit 12 avoids use of the cell having the highest radio quality for SCC communications in the CA communications.

A second feature of the embodiment is a radio base station eNB capable of performing CA communications with a mobile station by using a PCC and one or more SCCs. The radio base station eNB includes a CA controller unit 12 configured to determine a PCC and SCCs to be used for the CA communications, and a receiver unit 11 configured to receive "Measurement Report" from the mobile station UE that has detected a cell in a certain SCC, the cell having a higher radio quality than the radio quality of the cell (serving cell) during communications by a predetermined offset value or more for a period of TTT or longer, the "Measurement Report" containing the radio quality of the detected cell (and the ID of the cell). If the cell having the highest radio quality in the measurement object CC is not under the control of the radio base station eNB, the CA controller unit 12 removes the above SCC from the CA communications.

A third feature of the embodiment is a mobile communication method for performing CA communications between a mobile station UE and a radio base station eNB by using a PCC and one or more SCCs, the method including the steps in which: the mobile station UE sends "Measurement Report" to the radio base station eNB when the mobile station UE detects a cell having a higher radio quality than a predetermined threshold for a period of TTT or longer, or a cell in a carrier other than the PCC, the cell having a higher radio quality than a value obtained by subtracting a predetermined value from the radio quality of the cell (serving cell) during PCC communications, the "Measurement Report" containing the radio quality of the detected cell (and the ID of the cell); and if the cell having the highest radio quality in a measurement object CC is not under the control of the radio base station eNB, the radio base station eNB avoids use of the cell having the highest radio quality for SCC communications in the CA communications.

A fourth feature of the embodiment is a mobile communication method for performing CA communications between a mobile station UE and a radio base station eNB by using a PCC and one or more SCCs, the method including the steps in which: the mobile station UE sends "Measurement Report" to the radio base station eNB when the mobile station UE detects a cell in a certain SCC, the cell having a higher radio quality than the radio quality of the cell (serving cell) during communications by a predetermined offset value or more for a period of TTT or longer, the "Measurement Report" containing the radio quality of the detected cell (and the ID of the cell); and If the cell having the highest radio quality in a measurement object CC is not under the control of the radio base station eNB, the radio base station eNB removes the above SCC from the CA communications.

It should be noted that the aforementioned operations of the radio base stations eNB and the mobile stations UE may be implemented by hardware, may be implemented by a software module run by a processor, or may be implemented by a combination of the two.

The software module may be installed in a storage medium in any format such as a RAM (Random Access Memory), a flash memory, a ROM (Read Only Memory), a EPROM (Erasable Programmable ROM), a EEPROM (Electronically Erasable and Programmable ROM), a register, a hard disk drive, a removable disk or a CD-ROM.

Such storage medium is connected to the processor so that the processor can read and write information from and to the storage medium. Instead, the storage medium may be integrated with the processor. Also, the storage medium and the processor may be mounted in an ASIC. The ASIC may be provided in the radio base station eNB and the mobile station UE. Alternatively, the storage medium and the processor may be provided as discrete components in the radio base station eNB and the mobile station UE.

Hereinabove, the present invention has been described in detail by using the aforementioned embodiments. However, it is apparent to those skilled in the art that the present invention should not be limited to the embodiments described in this description. The present invention can be implemented as modified or altered embodiments without departing from the spirit and scope of the present invention. Hence, this description provided herein is only for illustrative purposes and is not intended to impose any limitation on the present invention.

INDUSTRIAL APPLICABILITY

According to the present invention, a radio base station and a mobile communication method can be provided which are capable of performing CA communications in consideration of the influence of interference with a neighboring radio base station as described above.

EXPLANATION OF THE REFERENCE NUMERALS

UE mobile station
eNB radio base station
11 receiver unit
12 CA controller unit
13 transmitter unit

The invention claimed is:

1. A radio base station capable of performing communications with a mobile station by using a primary carrier and one or more secondary carriers which are different in carrier frequency from the primary carrier, the radio base station comprising:
a controller unit configured to determine a primary carrier and secondary carriers to be used in the communications; and
a receiver unit configured to receive a measurement report from the mobile station that has detected a cell having a higher radio quality than a predetermined threshold for a predetermined time period or longer, or a cell in a carrier other than the primary carrier, the cell having a higher radio quality than a value obtained by subtracting a predetermined value from the radio quality of a cell during communication on the primary carrier, the measurement report containing the radio quality of the detected cell, wherein
if the cell having the highest radio quality in a measurement object carrier is not under the control of the radio base station, the controller unit avoids use of the cell having the highest radio quality in communications on the secondary carriers.

2. A radio base station capable of performing communications with a mobile station by using a primary carrier and one or more secondary carriers which are different in carrier frequency from the primary carrier, the radio base station comprising:
a controller unit configured to determine a primary carrier and secondary carriers to be used in the communications; and
a receiver unit configured to receive a measurement report from the mobile station that has detected a cell in a certain secondary carrier, the cell having a higher radio quality than the radio quality of a cell during communications by a predetermined offset value or more for a predetermined time period or longer, the measurement report containing the radio quality of the detected cell, wherein
if the cell having the highest radio quality in a measurement object carrier is not under the control of the radio base station, the controller unit removes the secondary carrier from the communications.

3. A mobile communication method for operating communications between a mobile station and a radio base station by using a primary carrier and one or more secondary carriers which are different in carrier frequency from the primary carrier, the method comprising the steps of:
sending a measurement report to the radio base station from the mobile station when the mobile station detects a cell having a higher radio quality than a predetermined threshold for a predetermined time period or longer, or a cell in a carrier other than the primary carrier, the cell having a higher radio quality than a value obtained by subtracting a predetermined value from the radio quality of the cell during communications on the primary carrier, the measurement report containing the radio quality of the detected cell; and
if the cell having the highest radio quality in a measurement object carrier is not under the control of the radio base station, causing the radio base station to avoid use of the cell having the highest radio quality in the communications.

4. A mobile communication method for operating communications between a mobile station and a radio base station by using a primary carrier and one or more secondary carriers which are different in carrier frequency from the primary carrier, the method comprising the steps of:
sending a measurement report to the radio base station from the mobile station when the mobile station detects a cell in a certain secondary carrier, the cell having a higher radio quality than the radio quality of the cell during communications by a preset offset value or more for a predetermined time period or longer, the measurement report containing the radio quality of the detected cell; and
if the cell having the highest radio quality in a measurement object carrier is not under the control of the radio base station, causing the radio base station to remove the secondary carrier from the communications.

* * * * *